(12) United States Patent
Tao et al.

(10) Patent No.: US 12,028,849 B2
(45) Date of Patent: Jul. 2, 2024

(54) USER EQUIPMENT AND SYSTEM PERFORMING TRANSMISSION AND RECEPTION OPERATIONS

(71) Applicant: Panasonic Intellectual Property Corporation of America, Torrance, CA (US)

(72) Inventors: Ming-Hung Tao, Frankfurt am Main (DE); Hidetoshi Suzuki, Kanagawa (JP); Rikin Shah, Langen (DE); Quan Kuang, Frankfurt (DE)

(73) Assignee: Panasonic Intellectual Property Corporation of America

( * ) Notice: Subject to any disclaimer, the term of this patent is extended or adjusted under 35 U.S.C. 154(b) by 413 days.

(21) Appl. No.: 17/375,938

(22) Filed: Jul. 14, 2021

(65) Prior Publication Data

US 2021/0345367 A1    Nov. 4, 2021

Related U.S. Application Data

(63) Continuation of application No. PCT/EP2019/080385, filed on Nov. 6, 2019.

(30) Foreign Application Priority Data

Jan. 17, 2019   (EP) .................................... 19152357

(51) Int. Cl.
*H04W 72/23*     (2023.01)
*H04W 72/0446*   (2023.01)
*H04W 72/1263*   (2023.01)

(52) U.S. Cl.
CPC ... *H04W 72/1263* (2013.01); *H04W 72/0446* (2013.01); *H04W 72/23* (2023.01)

(58) Field of Classification Search
CPC ............. H04W 72/1263; H04W 72/23; H04W 72/0446; H04W 72/232; H04W 72/231; H04W 72/25; H04W 72/72; H04W 72/27
See application file for complete search history.

(56) References Cited

U.S. PATENT DOCUMENTS 8,976,714 B2 *   3/2015   Worrall ............... H04W 74/006
                                                      370/252
9,763,187 B1 *   9/2017   Govindassamy ..... H04W 36/04
(Continued)

OTHER PUBLICATIONS

Japanese Notice of Reasons for Rejection, dated Jun. 6, 2023, for Japanese Application 1 No. 2021-540872. (11 pages) (with English translation).

(Continued)

*Primary Examiner* — Jean A Gelin
(74) *Attorney, Agent, or Firm* — Seed IP Law Group LLP

(57) ABSTRACT

The present disclosure relates to a mobile terminal, a system and respective methods. The user equipment receives a SI configuration for an SI message, the configuration indicating a periodicity at which the SI message is being broadcasted, determines that receiving the SI message, to be broadcasted in one of plural first time windows that are reoccurring at the indicated periodicity, is unsuccessful, and transmits a SI request for the SI message after determining the unsuccessful receipt of the SI message. The SI request includes an indication of the at least one SI message to be broadcasted. Then, the user equipment receives the at least one SI message within at least one second time window occurs after the one of the plural first time windows and before the next of the first time window that is reoccurring at the indicated periodicity, and determines that receiving the SI message is successful.

15 Claims, 5 Drawing Sheets

(56) References Cited

U.S. PATENT DOCUMENTS

| | | | |
|---|---|---|---|
| 2012/0063370 A1* | 3/2012 | Worrall | H04W 74/006 370/280 |
| 2014/0211750 A1* | 7/2014 | Larsson | H04W 68/02 370/329 |
| 2018/0049244 A1 | 2/2018 | Lee | |
| 2018/0167918 A1* | 6/2018 | Ishii | H04W 72/23 |
| 2018/0220288 A1* | 8/2018 | Agiwal | H04W 4/30 |
| 2018/0262895 A1* | 9/2018 | Jeppsson | H04L 1/08 |
| 2018/0270855 A1 | 9/2018 | Loehr et al. | |
| 2018/0279377 A1* | 9/2018 | Lin | H04W 74/0833 |
| 2018/0317263 A1* | 11/2018 | Ishii | H04W 74/0833 |
| 2019/0306889 A1* | 10/2019 | Lee | H04L 1/1819 |
| 2020/0288377 A1* | 9/2020 | Liu | H04W 48/12 |

OTHER PUBLICATIONS

MediaTek Inc., "[M201] SIB size limitation," R2-1811300, 3GPP TSG-RAN WG2 #103, 2 Gothenburg, Sweden, Aug. 20-24, 2018. (3 pages).

3GPP TS 38.331 V15.3.0, "3rd Generation Partnership Project; Technical Specification Group Radio Access Network; NR; Radio Resource Control (RRC) protocol specification (Release 15)," Sep. 2018, 445 pages.

Ericsson, "Dedicated RRC signaling for request and delivery of on-demand SI in NR-U," R2-1815047, Agenda Item: 11.2.2.1, 3GPP TSG-RAN WG2 #103bis, Chengdu, China, Oct. 8-12, 2018, 2 pages.

Extended European Search Report, dated Jul. 5, 2019, for corresponding European Application No. 19152357.0-1219, 13 pages.

International Search Report, mailed Jan. 17, 2020, for corresponding International Application No. PCT/EP2019/080385, 4 pages.

Oppo, "System information enhancements for NR-U," R2-1816267, Agenda Item: 11.2.2.1, 3GPP TSG-RAM WG2 Meeting #104, Spokane, USA, Nov. 12-16, 2018, 4 pages.

Samsung, "Mapping between SI Messages and SI Windows in NR-U," R2-1816317, Agenda Item: 11.2.2.1, 3GPP TSG-RAN2 104, Spokane, USA, Nov. 12-16, 2018, 3 pages.

Awada et al., "An Improved Method for On-Demand System Information Broadcast in 5G Networks," 2017 IEEE Conference on Standards for Communications and Networking (CSCN), Helsinki, Finland, Sep. 18-20, 2017, pp. 18-23. (6 pages).

Chinese Office Action, issued Aug. 10, 2023, for Chinese Patent Application No. 201980089346.4. (25 pages) (with English translation).

Samsung, "System info scheduling," R2-073302, Agenda Item: 5.3.1, 3GPP TSG-RAN2 Meeting #59, Athens, Greece, Jun. 25-29, 2007. (4 pages).

* cited by examiner

USER EQUIPMENT AND SYSTEM PERFORMING TRANSMISSION AND RECEPTION OPERATIONS

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz.

The NR is a follower of the technology represented by Long Term Evolution (LTE) and LTE Advanced (LTE-A). The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like.

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks.

The services eMBB and URLLC are similar in that they both demand a very broad bandwidth, however are different in that the URLLC service requires ultra-low latencies. In NR, the Physical layer is based on time-frequency resources (such as Orthogonal Frequency Division Multiplexing, OFDM in LTE) and may support multiple antenna operation.

For systems like LTE and NR, further improvements and options may facilitating efficient operation of the communication system as well as particular devices pertaining to the system.

BRIEF SUMMARY

One non-limiting and exemplary embodiment facilitates SI message acquisition and may particularly facilitate achieving a flexible, reliable and robust acquisition thereof.

In an embodiment, the techniques disclosed herein feature a user equipment, UE, comprising a receiver, a transmitter and processing circuitry. The receiver, in operation, receives a system information configuration for at least one system information, SI, message, the configuration indicating a periodicity at which the at least one SI message is being broadcasted. The processing circuitry, in operation and using the receiver, determines that receiving the at least one SI message, to be broadcasted in one of plural first time windows that are reoccurring at the indicated periodicity, is unsuccessful. The transmitter, in operation, transmits a SI request for the at least one SI message after determining the unsuccessful receipt of the at least one SI message, wherein the SI request includes an indication of the at least one SI message to be broadcasted. Further, the receiver, in operation, receives the at least one SI message within at least one second time window which occurs after the one of the plural first time windows and before the next of the first time window that is reoccurring at the indicated periodicity, and the processor, in operation, determines that receiving the at least one SI message is successful.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

Figure 1:
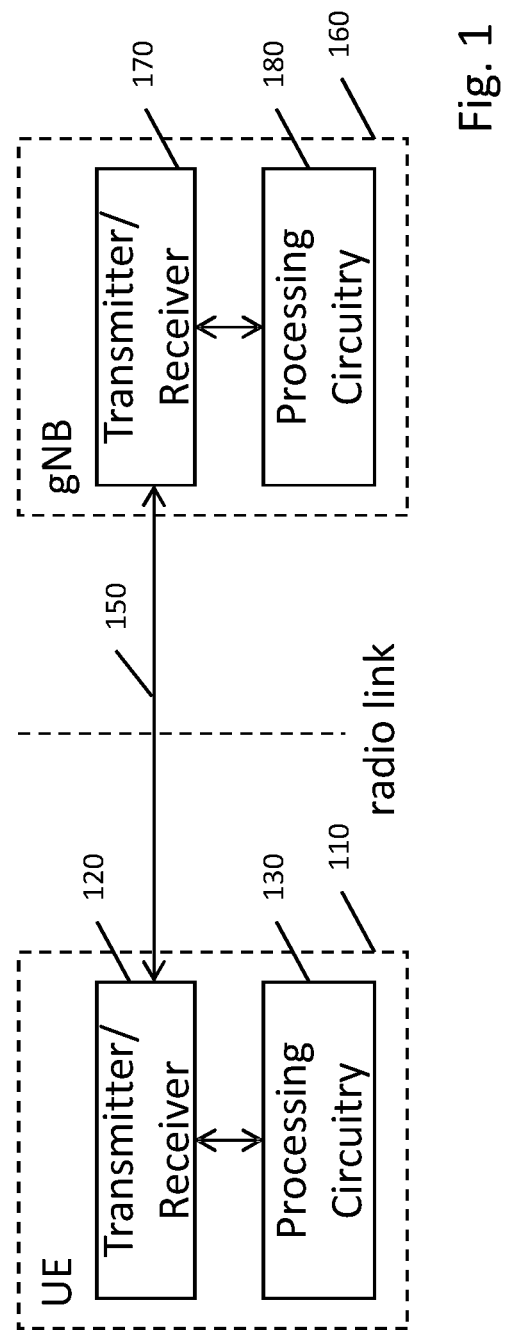
FIG. 1 shows an exemplary communication system for 3GPP NR including an exemplary user equipment UE and a system such as a base station BS or gNB.

FIG. 1 shows an exemplary communication system including a user equipment (UE) and a (wireless access) system with the functionality of a base station (BS) in a wireless communication network. Such communication system may be a 3GPP system such as NR and/or LTE and/or UMTS.

For example, as illustrated in FIG. 1, the base station (BS) may be a gNB (gNodeB, e.g., an NR gNB) or an eNB (eNodeB, e.g., an LTE gNB). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

A mobile terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station forms at least part of a system of interconnected units, for instance a (central) baseband unit and different radio frequency units, interfacing different antenna panels or radio heads in the network for providing services to terminals. In other words, a base station provides wireless access to terminals.

Facilitating wireless access of UEs, a base station of a 3GPP system is broadcasting system information (SI) in each (radio) cells. System information is divided into a master information block (MIB) and a number of system information blocks (SIBs). These blocks may be characterized as follows:

The MIB is always transmitted on the Broadcast Channel (BCH) with a periodicity of 80 ms and repetitions made within 80 ms and it includes parameters that are needed to acquire SIB1 from the cell. The first transmission of the MIB is scheduled in defined subframes and repetitions are scheduled according to the period of Synchronization Signal Block (SSB).

The SIB1 is transmitted on the Downlink-Shared Channel (DL-SCH) with a periodicity of 160 ms and variable transmission repetition periodicity. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period.

SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB.

SIBs other than SIB1 are carried in System Information (SI) messages, which are transmitted on the DL-SCH.

Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap.

That is, within one SI-window only the corresponding SI message is transmitted. Any SIB except SIB1 can be configured to be cell specific or area specific, using an indication in SIB 1. The cell specific SIB is applicable only within a cell that provides the SIB while the area specific SIB is applicable within an area referred to as SI area, which consists of one or several cells and is identified by systemInformationAreaID.

The UE applies a SI acquisition procedure to acquire AS- and NAS information. The procedure applies to UEs in RRC_IDLE, in RRC_INACTIVE and in RRC_CONNECTED. For a UE in RRC_CONNECTED, the network can also provide system information through dedicated signalling using the RRCReconfiguration message.

The UE in RRC_IDLE and RRC_INACTIVE shall ensure having a valid version of (at least) the MIB, SIB1 through SIB4 and SIB5 (if the UE supports E-UTRA).

The SI acquisition procedure is applied by UEs upon cell selection (e.g., upon power on), cell-reselection, return from out of coverage, after reconfiguration with sync completion, after entering the network from another RAT, upon receiving an indication that the system information has changed, upon receiving a PWS notification; whenever the UE does not have a valid version of a stored SI.

When the UE acquires a MIB or a SIB1 or a SI message in a serving cell, the UE stores the acquired SI. A version of the SI that the UE stored is no longer valid 3 hours after acquisition. The UE may use a valid stored version of the SI except MIB and SIB1, e.g., after cell re-selection, upon return from out of coverage or after the reception of SI change indication.

The SI acquisition procedure includes the acquisition of MIB and SIB1, as well as the acquisition of an SI message. An exemplary mechanism for the acquisition of MIB and SIB1 is described in section 5.2.2.3.1 of 3GPP TS 38.331 in V15.3.0. And an exemplary mechanism for the acquisition of an SI message is described in section 5.2.2.3.2 of 3GPP TS 38.331 in V15.3.0.

In a first example, the SI message acquisition includes that the UE receives the physical downlink control channel (PDCCH) containing the scheduling radio network temporary identifier (RNTI), i.e., SI-RNTI, from the start of the SI-window and continue until the end of the SI-window whose absolute length in time is given by si-WindowLength, or until the SI message was received. If the SI message was not received by the end of the SI-window, the UE repeats reception at the next SI-window occasion for the concerned SI message.

As the SI message is transmitted on PDCCH with a scheduling RNTI, i.e., SI-RNTI, in a configured common search space (e.g., common to all UEs in the cell), this mechanism is also known as the acquisition of broadcasted (no dedicated signaling required) SI message. The UE is only required to acquire broadcasted SI message if the UE can acquire it without disrupting unicast data reception, e.g., the broadcast and unicast beams are quasi co-located.

In a second example, the SI message acquisition includes that the UE first transmits a request for on demand system information, and subsequently also receives the PDCCH containing the scheduling RNTI, e.g., SI-RNTI, from the start of the SI-window and continue until the end of the SI-window whose absolute length in time is given by si-WindowLength, or until the SI message was received. Also, if the SI message was not received by the end of the SI-window, repeat reception at the next SI-window occasion for the concerned SI message.

For requesting on demand system information, SIB1 includes si-SchedulingInfo containing si-RequestConfig or si-RequestConfigSUL. With this, a UE may trigger the lower layer to initiate the Random Access procedure using the PRACH preamble(s) and PRACH resource(s) in si-RequestConfig corresponding to the SI message(s) that the UE requires to operate within the cell, and for which si-BroadcastStatus is set to notBroadcasting.

When the information element (IE) si-BroadcastStatus in SIB1 is set to Broadcasting, then the first example of a SI message acquisition mechanism may be used, and if the IE si-BroadcastStatus is set to notBroadcasting, then the second example of a SI message acquisition mechanism may be used.

The present disclosure provides approaches which may facilitate SI message acquisition and may particularly facilitate achieving a flexible, reliable and robust acquisition thereof.

The mechanisms disclosed herein may, for instance, facilitate satisfying increased requirements on reliability and robustness by exploring the possibility of an unsuccessful SI message acquisition. Further, the mechanisms disclosed herein may, for instance, facilitate improving the flexibility in acquiring SI messages by alleviating restrictions and limitations inherent to the conventional definition of SI-window occasions.

Particularly, it has been recognized by the authors of the present disclosure that both SI message acquisition mechanism according to the above first example, and according to the above second example have disadvantages.

Restricting or limiting the broadcasting of SI messages to statically configured SI-windows may be disadvantageous when attempting to satisfy increased requirements on reliability and robustness and may be inflexible as it may unnecessarily prolong the latency inherent to the SI message acquisition.

Generic Scenario

In view of the above, the inventors have recognized the need for a mechanism which facilitates providing a reliable and robust SI acquisition mechanism which may cope with unsuccessful SI message acquisitions and further improve the flexibility in dealing therewith.

In particular, the generic scenario is founded on the understanding that restrictions and limitations inherent to the static definition of SI-window occasions can be alleviated when complementing same, upon demand, with additional SI-window occasions (or second time windows). The additional SI-window occasions are neither intended to adapt nor meant to replace the statically defined SI-window occasions. Rather, the additional SI-window occasions complement same statically defined SI-window occasions where necessary.

For example, in case of an unsuccessful SI message acquisition within one of the statically defined SI-window occasion, the generic scenario provides for explicit SI requests, which will set off a reattempt to broadcast the unsuccessfully acquired SI message. However, such reattempts do not rely on the statically defined SI-window occasions but instead on the additional SI-window occasions.

Permitting the additional SI-window occasions for the reattempted broadcasting of SI messages to occur upon-demand and at different locations than that of the statically defined SI-window occasions, the reliability and robustness of the SI message acquisition is facilitated to be improved. Implementations are also disclosed where the locations of additional SI-window occasions are dynamically changeable. By deferring the starting point of an additional SI-window occasion, its locations can be flexibly adjusted to the respective communication environment.

In any case, the generic scenario continuously and consistently relies on broadcasting for the acquisition of SI messages. Broadcasting has proven to be a superior communication technique for the distribution of system information within the cell of a wireless communication system. Thus, also for any reattempts in additional SI-window occasions the SI messages are being broadcast, thereby facilitating a simultaneous reception by plural mobile terminals.

In the following, mobile terminals, base stations, and procedures to meet these needs will be described in relation to the new radio access technology envisioned for the 5G mobile communication systems, but which may also be used in LTE mobile communication system. Different implementations and variants will be explained as well. The following disclosure has been facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples for illustration purposes and should not limit the scope of the disclosure. A skilled reader will be aware that the principles of the following disclosure and as laid out in the claims can be applied to different scenarios and in ways that are not explicitly described herein.

Moreover, some of the terms of the procedures, entities, layers etc. used in the following are closely related to LTE/LTE-A systems or to terminology used in the current 3GPP 5G standardization, even though specific terminology to be used in the context of the new radio access technology for the next 3GPP 5G communication systems is not fully decided yet.

Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

FIG. 1 illustrates a block diagram of a wireless communication system including a user equipment 110 (also referred to as UE), and a (wireless access) system 160 such as a base station (also referred to as BS, g Node B, gNB). The user equipment 110 comprises (processing) circuitry 130 and a transmitter/receiver (or transceiver) 120 which are indicated as separate building blocks in the diagram.

Similarly, (wireless access) system 160, such as a base station, comprises (processing) circuitry 180 and a transmitter/receiver (or transceiver) 170, which are indicated as separate building blocks in the diagram. The transmitter/receiver 120 of the user equipment 110 is communicatively coupled via a radio link 150 with the transmitter/receiver 170 of the system 160.

Figure 3:
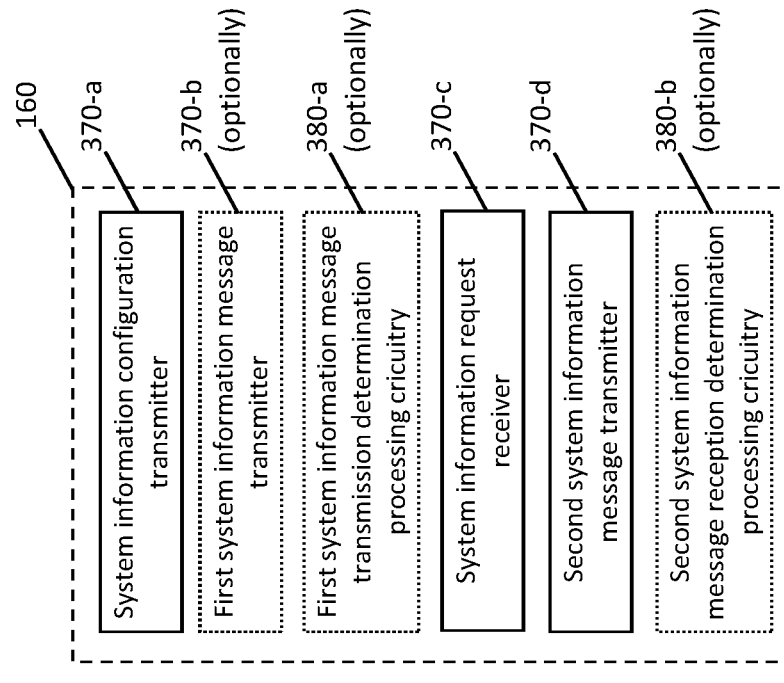
FIGS. 2 and 3 show block diagrams of an exemplary structure of a circuitry of a user equipment and of a circuitry of a gNB.
Figure 2:
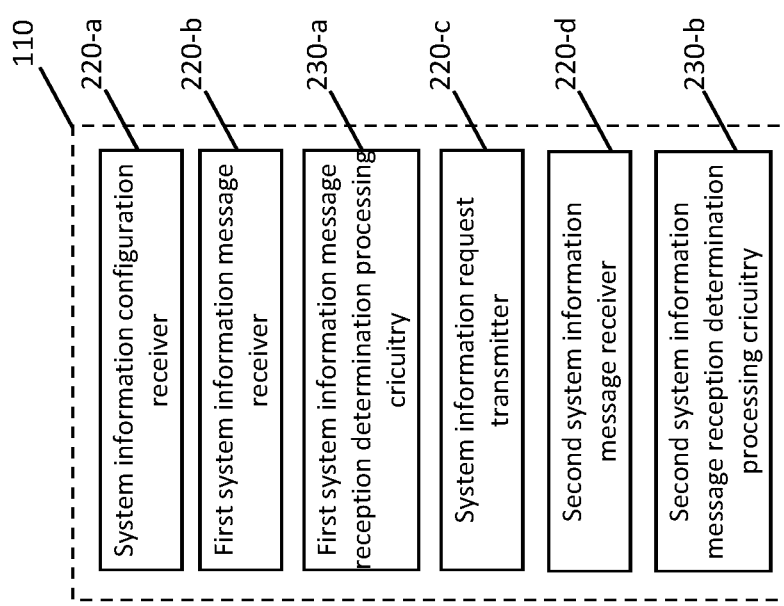

FIGS. 2 and 3 depict exemplary implementations of the building blocks of the user equipment 110 and of the (wireless access) system 160, respectively.

The user equipment 110 of the exemplary implementation includes a system information configuration receiver 220-*a*, a first information message receiver 220-*b*, a first information message reception determination processing circuitry 230-*a*, a system information request transmitter 220-*c*, a second system information message receiver 220-*d*, and a second system information message reception determination processing circuitry 230-*b*.

For example, the receivers 220-*a*, 220-*b*, and 220-*d* and the transmitter 220-*c* can be combined in a common receiver/transmitter building block, and the processing circuitry 230-*a* and 230-*b* can be combined in a common processing circuitry building block as shown in FIG. 1.

The system 160 of the exemplary implementation includes a system information configuration transmitter 370-*a*, optionally a first system information message transmitter 370-*b*, optionally a first system information message transmission determination circuitry 380-*a*, a system information request receiver 370-*c*, a second system information message transmitter 370-*d*, and optionally a second system information message reception determination processing circuitry 380-*b*.

For example, the transmitters 370-*a*, 370-*b* and 370-*d*, and the receiver 370-*c* can be combined in a common receiver/transmitter building block, and the processing circuitry 380-*a* and 380-*b* can be combined in a common processing circuitry building block as shown in FIG. 1.

In general, the present disclosure assumes that the UE 110 is in communication reach to the system 160 (or gNB) and is operating in a state where at least one system information (SI) message is to be acquired. Again, the at least SI message shall be understood as carrying one or more system information blocks (SIBs) excluding SIB1 having a same periodicity.

For example, when the UE 110 is in a cell selection state (e.g., upon power up) it acquires MIB, SIB1 through SIB4 and SIB5 (e.g., if the UE supports E-UTRA). SIBs other than SIB1 are carried in system information (SI) messages. Accordingly, the SIB2 through SIB4 and SIB5 will have to be acquired in form of SI messages.

Further, the present disclosure assumes that the at least one SI messages, to be acquired by the UE 110, is being broadcasted by the (wireless access) system 160. The system 160 may broadcast plural SI messages having different periodicities. And the at least one SI message which is to be acquired by the UE 110 is only a subset of the plurality of broadcast SI messages.

Even further, the present disclosure assumes a generic scenario where SI message acquisitions (solely) rely on broadcasted SI messages, e.g., a mechanism in which SI messages are simultaneously transmitted to plural UEs, not using dedicated signaling.

Hence, mechanisms providing system information through dedicated signaling, e.g., using RRCReconfiguration messages, are omitted in the present disclosure. In other words, even though some 3GPP systems permit configuring SI messages with a notBroadcasing status (instead of the broadcasting status), this is not in the focus of the present disclosure.

Figure 4:
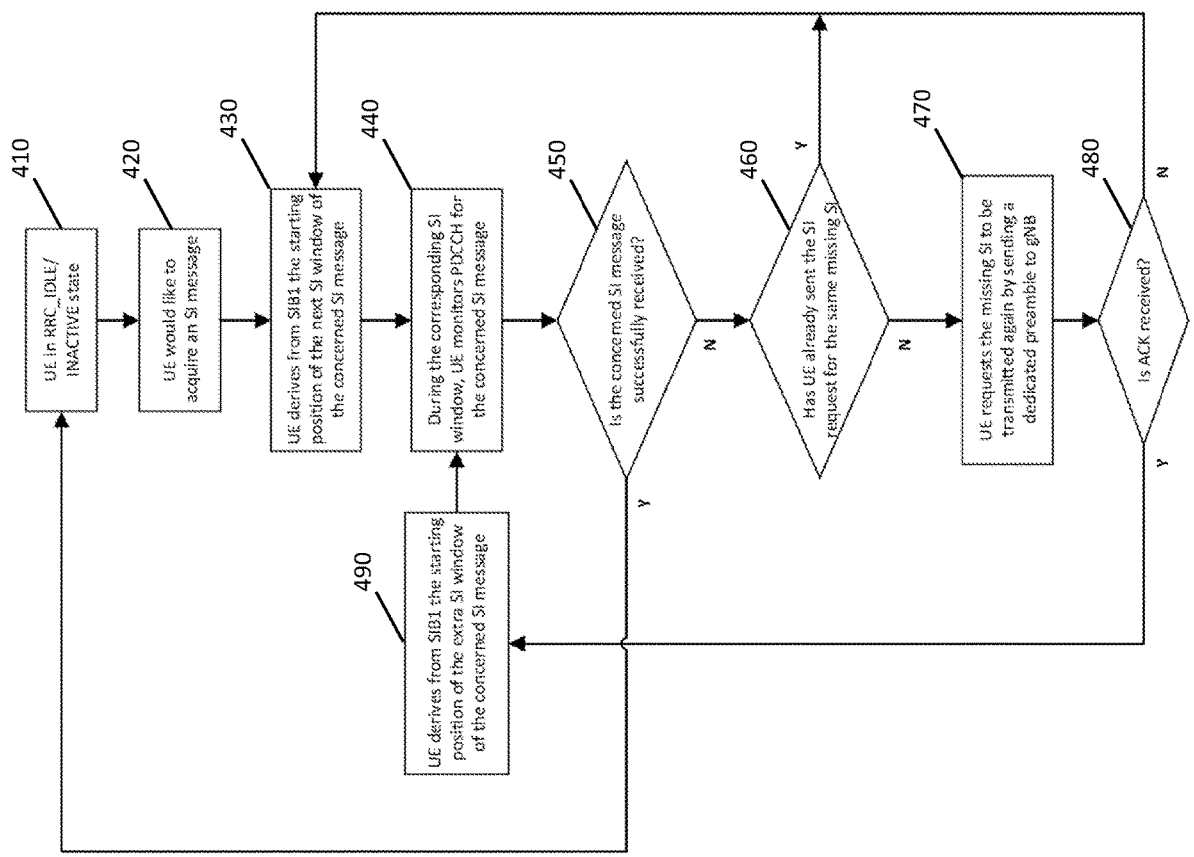
FIG. 4 illustrates a sequence diagram for acquiring a system information (SI) message by a user equipment according to an exemplary implementation.

For ease of understanding, the following description also references the sequence diagram as shown in FIG. 4 which exemplifies an implementation of a user equipment acquiring a system information (SI) message in a 3GPP NR scenario. The use of specific terminology of 3GPP systems shall however not be understood as limiting the disclosure.

In general, there can be numerous reasons which may permit or (even) require the UE 110 to acquire broadcasted SI messages. For example, the UE 110 may be operating (see, e.g., step 410 in FIG. 4) in the RRC_IDLE or RRC_INACTIVE state. In these states, it is not possible for the UE to use dedicated signaling for instance, e.g., in form of the RRCReconfiguration message. For instance, the RRC_IDLE state is assumed by every UE upon power on.

This shall not be understood as a limitation to the present disclosure. The following description equally applies for a UE which is operating in the RRC_CONNECTED state.

Then, the UE 110 determines (see, e.g., step 420 in FIG. 4) that it has to acquire a SI message. The SI message acquisition may be triggered for numerous reasons. For example, the UE may determine that system information blocks, which it has previously acquired, are no longer valid. Also, for example, the UE may acquire a change indication indicating that a system information block has been updated.

Then, the transmitter 120 of UE 110 receives (see, e.g., step 430 in FIG. 4) a system information configuration for at least one system information (SI) message. The system information configuration indicates, among others, the periodicity at which the at least one SI message is being broadcast. For example, this reception operation may be performed by the system information configuration receiver 220-a of FIG. 2.

For example, the system information configuration may also (explicitly) indicate that the at least one SI message is being transmitted via broadcasting, e.g., has a broadcasting status. In view of the assumptions made above, the (explicit) indication can be dispensable.

In an exemplary 3GPP NR implementation, the system information configuration is carried by System Information Block type 1 (SIB1) which contains the si-SchedulingInfo information element. This information element facilitates the acquisition of SI messages by the UE as it specifies, among others, the periodicity (termed: si-Periodicity) at which the at least one SI message is broadcast. Also this information element specifies the mapping (termed: si-MappingInfo) of types of system information blocks (SIBs) included in the at least one SI message.

For instance, the periodicity can be indicated to be one of eight radio frames (termed: rf8), sixteen radio frames (termed: rf16), 32 radio frames (termed: rf32) or in increasing multiples of two, up to 512 radio frames. The mapping of type of SIBs can be indicated in a list of one or more entries of indications in form of sibType2, sibType3, sibType4, sibType5, . . . .

The si-SchedulingInfo information element of the exemplary implementation also includes an indication of the broadcasting status (termed: si-BroadcastStatus) for the at least one SI message. This explicitly indicates the broadcasting status as broadcasting or notBroadcasting.

```
si-WindowLength            ENUMERATED {s5, s10, s20, s40, s80, s160,
  s320, s640, s1280},
si-RequestConfig           SI-RequestConfig         OPTIONAL, -- Cond
  MSG-1
si-RequestConfigSUL        SI-RequestConfig         OPTIONAL, -- Cond
  SUL-MSG-1
systemInformationAreaID    BIT STRING (SIZE (24))   OPTIONAL, -- Need R
...
}
SchedulingInfo ::=         SEQUENCE {
si-BroadcastStatus         ENUMERATED {broadcasting, notBroadcasting),
si-Periodicity             ENUMERATED {rf8, rf16, rf32, rf64, rf128,
  rf256, rf512),
sib-MappingInfo            SIB-Mapping
}
SIB-Mapping ::=            SEQUENCE (SIZE (1..maxSIB)) OF SIB-TypeInfo
SIB-TypeInfo ::=           SEQUENCE {
type                       ENUMERATED {sibType2, sibType3, sibType4,
  sibType5, sibType6, sibType7, sibType8, sibType9, spare8, spare7, spare6, spare5,
  spare4, spare3, spare2, spare1,... },
valueTag                   INTEGER (0..31)          OPTIONAL, -- Cond
SIB-TYPE
```

```
areaScope              ENUMERATED {true}            OPTIONAL -- Cond
AREA-ID
}
-- Configuration for Msg1 based SI Request
SI-RequestConfig::=    SEQUENCE {
rach-OccasionsSI       SEQUENCE {
rach-ConfigSI          RACH-ConfigGeneric,
ssb-perRACH-Occasion   ENUMERATED {oneEighth, oneFourth, oneHalf,
one, two, four, eight, sixteen}
}                                                   OPTIONAL, --
Need P
si-RequestPeriod       ENUMERATED {one, two, four, six, eight, ten,
twelve, sixteen}
OPTIONAL, -- Need R
si-RequestResources    SEQUENCE (SIZE (1..maxSI-Message)) OF SI-
RequestResources
}
SI-RequestResources ::= SEQUENCE {
ra-PreambleStartIndex   INTEGER (0..63),
ra-AssociationPeriodIndex INTEGER (0..15)           OPTIONAL, --
Need R
ra-ssb-OccasionMaskIndex  INTEGER (0..15)           OPTIONAL -
Need P
}
-- TAG-OTHER-SI-INFO-STOP
-- ASN1STOP
```

With this system information configuration, the processing circuitry 130 of the UE 110 is capable of determining the location of a reoccurring first time window (e.g., the start or starting point and the length of the first time window) in which the UE 110 expects to receive the at least one SI message. The first time window is reoccurring at the periodicity indicated in the received system information configuration.

In an exemplary detail implementation, the UE 110 may determine the location of the reoccurring at least one first time window by separately inferring the start of the time window and the length of the time window for each of the at least one SI messages.

The UE 110 may infer the start of the time window for each of the at least one SI messages from the received system information configuration, e.g., without any explicit signaling therein. The UE 110 may also infer the length of the first time window without any additional information. For example, the length of the time window can be uniformly prescribed to always correspond to 5 slots. Then the UE 110 can infer the location of the first time window without any additional information.

For illustrative purposes, the following exemplary implementation with a fixed time window length is described.

The received system information configuration is configuring three SI messages, and the length of each SI message is prescribed to correspond to 1 slot. One of the exemplary three SI messages is configured with a periodicity of 8 radio frames and another of the exemplary three SI messages is configured with a periodicity of 16 radio frames and a third of the three SI messages is configured with a periodicity of 32 radio frames.

Then the UE 110 can infer for each of the three SI messages the radio frame in which it is to be broadcasted based on a system frame number (SFN) which is an integer multiple of the respective periodicity. In other words, the UE 110 can infer for the first SI message with periodicity of 8 radio frames that is to be broadcast in the radio frame with a SFN which meets the equation SFN mod 8=0. And for the second and third SI message, the UE 110 can infer those radio frames in which they are to be broadcast, respectively.

Considering that there exist radio frames which are integer multiples of all periodicities, namely integer multiples of 8, 16 and 32, there occur situation where all three SI message are to be broadcast by referring to the same radio frame. Thus, it is necessary for the UE to determine more closely the start of each of the respective time window for the SI messages.

Within the respective radio frames, the UE 110 can determine the start (or starting point) of the first time window for each SI message as a slot with a number which corresponds to the position of the respective entry(ies) which are included in the received system information configuration for the SI message. In other words, the sequence (e.g., order) in which the SI messages are referenced in the system information configuration determines the respective start of the first time window for each SI message.

For example, in a system information configuration which refers to (has an entry regarding) the SI message with periodicity of 8 radio frames, this determines the start of the respective time window at slot 0. And for the subsequent entries of SI messages with periodicity of 16 and 32 radio frames, this determines the start of the respective time window at slot 6 and slot 11 (the first slot of the subsequent radio frame), respectively.

Alternative implementations are also conceivable, for example, where the SI messages are transmitted in time windows of varying length. In this case, the system information configuration received by UE 110 may include additional information on the length of the time windows for each of the at least one SI message. Also then, it is possible for the UE 110 to infer the location of the time window, namely where it expects the at least one SI message to be broadcast.

For illustrative purposes, the following exemplary implementation with a variably indicated time window length is described.

The received system information is configuring (again) three SI messages with the above described periodicities of 8 radio frames, 16 radio frames and 32 radio frame respectively. Different from the above exemplary implementation, the length of each SI message is different, e.g., is individually configured in the system information configuration.

The exemplary first of the three SI messages with periodicity of 8 radio frames is indicated in the system information configuration to have a short time window length of 5 slot, the exemplary second of the three SI messages with periodicity of 16 radio frame is indicated in the system information configuration to have a longer time window length of 10 slots, and the exemplary third of the three SI messages with periodicity of 32 radio frames is indicated in the system information configuration to have a long time window of 20 slots.

As discussed above, the UE 110 can infer for each of the three SI messages the radio frame in which it is to be broadcasted based on a system frame number (SFN) which is an integer multiple of the respective periodicity.

Again, when considering that there exist radio frames which are integer multiples of all periodicities, namely integer multiples of 8, 16 and 32, there occur situation where all three SI message are to be broadcast by referring to the same radio frame. Thus, it is necessary for the UE to determine more closely the start of each of the respective time window for the SI messages.

Within the respective radio frames, the UE 110 can determine the start (or starting point) of the first time window for each SI message as a slot with a number which corresponds to the position of the respective entry(ies) and the respectively indicated window lengths which are included in the received system information configuration for the SI message. In other words, the sequence (e.g., order) in which the SI messages and the respectively indicated window lengths are referenced in the system information configuration determines the respective start of the time window for each SI message.

For example, in a system information configuration which refers to (has an entry regarding) the SI message with periodicity of 8 radio frames and a window length of 5 slot, this determines the start of the respective time window at slot 0. And for the subsequent entry of the SI message with periodicity of 16 radio frames and window length of 10 slots, this determines the start of the respective time window at slot 6. For the subsequent entry of the SI message with periodicity of 32 radio frames and a window length of 20 slots, this determines the start of the respective time window at slot 16.

In a 3GPP NR implementation of the above, the system information configuration permitting a variably defined window length may be defined as follows:

```
-- ASN1START
-- TAG-OTHER-SI-INFO-START
SI-SchedulingInfo ::=      SEQUENCE {
schedulingInfoList         SEQUENCE (SIZE (1..maxSI-Message)) OF
SchedulingInfo,
si-WindowLength            ENUMERATED [s5, s10, s20, s40, s80, s160,
s320, s640, s1280),
si-RequestConfig           SI-RequestConfig          OPTIONAL, -- Cond
MSG-1
si-RequestConfigSUL        SI-RequestConfig          OPTIONAL, -- Cond
SUL-M3G-1
systemInformationAreaID    BIT STRING (SIZE (24))    OPTIONAL, -- Need P
...
}
SchedulingInfo ::=         SEQUENCE {
si-BroadcastStatus         ENUMERATED {broadcasting, notBroadcasting),
si-Periodicity             ENUMERATED {rf8, rf16, rf32, rf64, rf128,
rf256, rf512),
si-WindowLength            ENUMERATED {s5, s10, s20, s40, s80, s160,
s320, s640, s1280),
sib-MappingInfo            SIB-Mapping
}
SIB-Mapping ::=            SEQUENCE (SIZE (1..maxSIB)) OF SIB-TypeInfo
SIB-TypeInfo ::=           SEQUENCE {
type                       ENUMERATED {sibType2, sibType3, sibType4,
sibType5, sibType6, sibType7, sibType8, sibType9, spare8, spare7, spare6, spare5,
spare4, spare3, spare2, spare1,... },
valueTag                   INTEGER (0..31)           OPTIONAL, -- Cond
SIB-TYPE
areaScope                  ENUMERATED {true}         OPTIONAL -- Cond
AREA-ID
}
-- Configuration for Msg1 based SI Request
SI-RequestConfig::=        SEQUENCE {
rach-OccasionsSI           SEQUENCE {
rach-ConfigSI              RACH-ConfigGeneric,
ssb-perRACH-Occasion       ENUMERATED {oneEighth, oneFourth, oneHalf,
one, two, four, eight, sixteen)
}                                                    OPTIONAL, --
Need R
si-RequestPeriod           ENUMERATED {one, two, four, six, eight, ten,
twelve, sixteen}
OPTIONAL, -- Need R
si-RequestResources        SEQUENCE (SIZE (1..maxSI-Message)) OF SI-
RequestResources
}
```

-continued

```
SI-RequestResources ::=    SEQUENCE {
ra-PreambleStartIndex      INTEGER (0..63),
ra-AssociationPeriodIndex  INTEGER (0..15)           OPTIONAL, --
Need R
ra-ssb-OccasionMaskIndex   INTEGER (0..15)           OPTIONAL -
Need P
}
-- TAG-OTHER-SI-INFO-STOP
-- AST1STOP
```

From the start (or starting point) of the first time window of each of the SI messages, the processing circuitry 130 of UE 110 monitors (see, e.g., step 440 in FIG. 4) a search space (e.g., PDCCH containing the scheduling RNTI, e.g., SI-RNTI) for information regarding the scheduling of the at least one SI message.

When the UE 110 receive such scheduling information, the receiver 120 of the UE 110 is capable of receiving (also) within the first time window the at least one SI messages (e.g., transmitted on DL-SCH). For example, this reception operation may be performed by the reception is first information message receiver 220-b.

In case the processing circuitry 130 of the UE 110 determines (see, e.g., step 450 in FIG. 4) at the end of the first time window that it is unsuccessful with receiving the at least one SI message, then disadvantageous implementations would require the UE 110 wait for the next one of the first time window that is reoccurring that the configure periodicity. This introduces a substantial delay into the SI message acquisition.

For example, this determination operation may be performed by the first information message reception determination processing circuitry 230-a.

Reverting back to the exemplary implementations discussed before, the determination of an unsuccessful reception of a SI message, for example, with the periodicity of 8 radio frames means that the UE will have to wait for 7 radio frames until it can at the start of the next first time window again monitor the common search space for scheduling information, and therewith receive the transmitted SI message.

Conversely, in the generic scenario, the transmitter 120 of UE 110 transmits (see, e.g., step 470 in FIG. 4) a system information (SI) request for the at least one SI message after determining the unsuccessful receipt of the at least on SI message. For example, this transmission operation may be performed by the system information request transmitter 220-c.

In more detail, after the end of the first time window the UE 110 directly transmits the SI request for the unsuccessfully received SI message, e.g., without waiting for another reception opportunity in the next first time window. Thereby, a delay for the UEs to receive SI messages is avoided, and the robustness of acquiring SI message is further improved.

This SI request is a request for the at least one SI message. In other words, the SI request is triggered due to the SI message's unsuccessful first reception attempt. Accordingly, it includes an indication of the at least one SI message for which it is transmitted by the UE 110 to the system 160.

In an exemplary implementation, each SI request (only) indicates the unsuccessful reception of one (single) SI message. And all the SI requests are commonly defined throughout the cell. Thereby, an adverse amount of collisions between or interference among different SI requests is mitigated. Due to the commonly definition of SI requests in the cell, transmissions from different UEs do not result in the loss of information.

For example, in case the reception of SI messages has been unsuccessful for a longer period of time, e.g., for an entire radio frame, then it is likely that plural, different UEs transmit SI request indicate the unsuccessful reception of same SI messages. With the common definition of the SI requests, there are however no adverse effects such as collisions or interference between SI requests which are indicating the unsuccessful reception of a same SI message.

In a further exemplary implementation, the processing circuitry 130 of the UE 110 determines (see, e.g., step 450 in FIG. 4), before sending a SI request, whether it has already sent the SI request before that has been positively acknowledged by the system 160. Only in case the SI request has not (already) been sent before or has not been acknowledged by the system 160, will it proceed with transmitting same SI request. In other words, in case the reception of an SI message in the at least one first time window is unsuccessful, the UE 110 transmits only once but not multiple times the respective SI request, unless the SI request is not received by the system 160.

In an exemplary 3GPP NR implementation, the system information (SI) request is transmitted through a Random Access procedure using the PRACH preamble(s) and PRACH resource(s) in si-RequestConfig corresponding to the SI message(s) that the UE wants to acquire. In other words, the PRACH preamble(s) and PRACH resource(s) for which the si-RequestConfig indicates a correspondence to SI message(s) permit signaling an according SI request.

When utilizing the Random Access procedure using the PRACH preamble(s) and PRACH resource(s) in si-RequestConfig, a common definition of the SI requests is achieved. In particular, commonly defined PRACH preamble(s) and PRACH resource(s) are used by plural UEs for indicating the unsuccessful reception of a same SI message. With such common definitions, adverse effects of collisions and interference can be mitigated.

In particular, the adverse effects are mitigated since the system 160 or BS does not need to know which UE has sent the SI request. Rather, the system 160 or BS will schedule a further (additional) broadcasting attempt for the respective SI message irrespective of whether one or more UE(s) 110 have transmitted the SI request.

Further, the Random Access procedure also includes signaling (see, e.g., step 480 in FIG. 4) an acknowledgement for (short: ACK) in response to the SI request. Once the ACK is received by a respective UE, then the UE can proceed with the further procedure described below (e.g., preparing for receiving the SI message in a second time window).

In more detail, in the Random Access procedure, the acknowledgement (ACK) is signaled over PDCCH being scrambled with a common random access, RA, radio network temporary identifier, RNTI (RA-RNTI). Thereby, even if more than one UE has transmitted the SI request using the same PRACH preamble(s) and PRACH resource(s), all the UE will receive the respective ACK and interpret it as a response to their individual SI request. Thereby, unnecessary repetitions are avoided.

After sending the SI request, UE 110 monitors the acknowledgment from the system 160. If UE 110 receives a positive acknowledgement for the SI request, the receiver 120 of UE 110 receives (see, e.g., step 480 in FIG. 4) the at least one SI message within a second time window, e.g., where the second time window is different from the first time window and occurs out-of-sequence when compared with the first time window which is reoccurring at the indicated periodicity. For example, this reception operation may be performed by the second system information message receiver 220-*d*.

In other words, the second time window occurs after the above discussed elapse of the first time window where the SI message reception was unsuccessful and before the next of the first time window reoccurring at the indicated periodicity. Thus, the second time window occurs in-between two subsequently occurrences of the first time window reoccurring at the indicated periodicity.

From the start of the second time window, the processing circuitry 130 of the UE 110 monitors a search space (e.g., PDCCH containing the scheduling RNTI, e.g., SI-RNTI) for the information regarding the scheduling of the at least one SI message for which the SI request was transmitted. When the UE 110 receives such scheduling information, it is capable of receiving (also) within the second time window the at least one SI message for which the SI request is transmitted.

In case the processing circuitry 130 of the UE 110 determines (see, e.g., case "Y" in step 450 in FIG. 4) before the end of the second time window that it is successful with receiving the at least one SI message, then the SI message acquisition terminates.

In case the processing circuitry 130 of the UE 110 determines (see, e.g., step 450 in FIG. 4) before the end of the second time window that it is unsuccessful with receiving the at least one SI message, then it proceeds to monitor a further one of the at least one second time windows, or the UE waits (see, e.g., case "N" in step 450 and case "Y" in step 460 in FIG. 4) until the next one of the at least one first time windows, reoccurring at the indicated periodicity.

For example, this determination operation may be performed by the second information message reception determination processing circuitry 230-*b*.

In an exemplary implementation, the system information configuration further indicates which SI message(s) is/are allowed to be broadcasted in the at least one second time window. In other words, with this indication it can be indicated that one or more SI message(s) are not allowed to be broadcasted in the at least one second time window. For such SI message(s), the UE will not transmit a corresponding SI request in response to the determination of an unsuccessful receipt within one of the at least one first time window, but instead will have to wait unit the next one of the first time windows for the reception thereof.

In a 3GPP NR implementation of the above, the system information configuration may be defined as follows. In case sib-MappingInfo is present in the additional time window setting (also referred to as second time window in the generic scenario), sib-MappingInfo indicates which SI messages are allowed to be transmitted in the additional time window; if sib-MappingInfo is not presented, it means all SI messages are allowed to be transmitted in the additional time window.

```
-- ASN1START
-- TAG-OTHER-SI-INFO-START
SI-SchedulingInfo ::=      SEQUENCE {
schedulingInfoList         SEQUENCE (SIZE (1..maxSI-Message)) OF
SchedulingInfo,
si-WindowLength            ENUMERATED {s5, s10, s20, s40, s80, s160,
s320, s640, s1280),
si-RequestConfig           SI-RequestConfig             OPTIONAL, -- Cond
M3G-1
si-RequestConfigSUL        SI-RequestConfig             OPTIONAL, -- Cond
SUL-MSG-1
systemInformationAreaID    BIT STRING (SIZE (24))       OPTIONAL, -- Need R
...
}
SchedulingInfo ::=         SEQUENCE {
si-BroadcastStatus         ENUMERATED {broadcasting, notBroadcasting,
additionalTimeWindow},
si-Periodicity             ENUMERATED {rf8, rf16, rf32, rf64, rf128,
rf256, rf512),
sib-MappingInfo            SIB-Mapping OPTIONAL
}
SIB-Mapping ::=            SEQUENCE (SIZE (1..maxSIB)) OF SIB-TypeInfo
SIB-TypeInfo ::=           SEQUENCE {
type                       ENUMERATED {sibType2, sibType3, sibType4,
sibType5, sibType6, sibType7, sibType8, sibType9, spare8, spare7, spare6, spare5,
spare4, spare3, spare2, spare1,... },
valueTag                   INTEGER (0..31)              OPTIONAL, -- Cond
SIB-TYPE
areaScope                  ENUMERATED {true}            OPTIONAL -- Cond
AREA-ID
}
```

```
-- Configuration for Msg1 based SI Request
SI-RequestConfig::=     SEQUENCE {
rach-OccasionsSI        SEQUENCE {
rach-ConfigSI           RACH-ConfigGeneric,
ssb-perRACH-Occasion    ENUMERATED {oneEighth, oneFourth, oneHalf,
one, two, four, eight, sixteen}
}                                                          OPTIONAL, --
Need R
si-RequestPeriod        ENUMERATED {one, two, four, six, eight, ten,
twelve, sixteen}
OPTIONAL, -- Need P
si-RequestResouroes     SEQUENCE (SIZE (1..maxSI-Message)) OF SI-
RequestResources
}
SI-RequestResources ::= SEQUENCE {
ra-PreambleStartIndex   INTEGER (0..63),
ra-AssociationPeriodIndex  INTEGER (0..15)                 OPTIONAL, --
Need R
ra-ssb-OccasionMaskIndex   INTEGER (0..15)                 OPTIONAL -
Need R
}
-- TAG-OTHER-SI-INFO-STOP
-- ASN1STOP
```

In a further exemplary implementation the scheduling information may be carried in one or more downlink control information (DCI) which is scheduling exactly one or plural, different SI messages, including the at least one SI message, within the (same) at least one second time window.

When scheduling plural SI message, then exactly one DCI may be used to (simultaneously) schedule the plural different SI messages. In this case, the exactly on DCI includes an indication which indicates each of the different SI messages which are scheduled within the (same) at least one second time window.

This can be achieved, for example, by specifying a dedicated DCI format for system information which carries a respective indication bit for each of entry(ies) corresponding to different SI messages in the system information configuration. The dedicated DCI is also scrambled with a (common) system information, SI, radio network temporary identifier.

When scheduling plural SI messages, then also plural DCIs may be used to (separately) schedule the plural different SI messages. In this case, each of the plural DCIs includes an indication which indicates the respective one of the plural SI messages which are scheduled within the (same) at least one second time window.

This can be achieved, for example, by specifying different SI-RNTIs, where each of the plural DCIs is scrambled with one of the different SI-RNTIs indicating the different SI message scheduled therewith.

In all these exemplary implementations, a UE receiving the one or more DCIs is facilitated to (immediately) determine whether or not the scheduled SI message is corresponding to the SI which the UE has requested earlier. This facilitates the reception operations by the UE within the at least one second time window.

Further to these exemplary implementations, the plural different SI messages may exemplarily be received in form of a radio resource control, RRC, message having a transport block size, TBS exceeding 2,976 bits. The prescribed transport block size TBS of 2,976 bits may present a restriction to a RRC message, which can prevent, depending on the number of different SI messages, the broadcasting of all SI messages in a single RRC message. By removing this restriction, the combined broadcasting of the plural different SI messages in the single RRC message is possible.

The second time window does not have a fixed periodicity at which it occurs. Rather, the second time window is monitored by a UE only when it has (before) transmitted at least one SI request. In response to the at least one SI request, the UE expects the requested SI message to be broadcasted in the second time window. For this reason, the second time window can be said to be provided out-of-sequence and only where necessary (e.g., on-demand).

Even further, the second time window may or may not have a fixed location where it occurs. Rather, as long as there is a common understanding where the second time window is located, then the UE 110 can use it for receiving the at least one broadcasted SI message which is normally transmitted in different first time windows with different periodicities.

In most general terms, the second time window may be commonly understood to be located after an according at least one SI request is transmitted from UE 110, namely after the first time window where the SI message reception was unsuccessful and before the next of the first time window reoccurring at the indicated periodicity.

Although this common understanding may prescribe a considerable lengthy second time window, this still attains advantageous over the previously discussed disadvantageous implementations, namely since the broadcasting of the SI message is performed out-of-sequence only when the SI message transmission is request.

Thereby, only those UEs are monitoring the second time window which have been unsuccessful in receiving the SI message in the first time window. The flexibility is improved. Additionally, non-requested SI messages are also not wasting radio resources which could be utilized for data transmission to other UEs of the system 160.

There exist numerous different implementations, which can achieve such common understanding regarding the location of the second time window which are discussed in the following in further detail. However, the present disclosure shall not be understood as being restricted in any such respect.

The above description has been given from the perspective of the UE. This shall, however, not be understood as a limitation to the present disclosure. The system 160 or base station, comprising transmitter/receiver 170, and processing circuitry 180, equally perform the generic scenario disclosed herein.

This entails that the transmitter 170 of the base station transmits a system information configuration for at least one system information, SI, message. The configuration indicates a periodicity at which the at least one SI message is being broadcasted. For example, this transmission operation may be performed by the system information configuration transmitter 370-a.

Optionally, the transmitter 170 of the base station transmits (or broadcasts) the at least one SI message, to be broadcasted in one of plural first time windows that are reoccurring at the configured indicated periodicity. For example, this transmission operation may be performed by the first system information message transmitter 370-b.

In the context of the present disclosure, it is not important for the SI message acquisition that the base station has actually attempted to transmit the SI message in the one of the plural first time windows. For example, there are also cases (e.g., when experiencing a failed clear channel assessment) where the base station does not perform any signal transmissions during the one of the plural first time windows.

Further optionally, the processing circuitry 180 of the base station (actively) determines an unsuccessful receipt of the at least one SI message to be broadcasted in one of plural first time windows that are reoccurring at the configured indicated periodicity. For example, this determination operation may be performed by the first system information message transmission determination circuitry 380-a.

For example, in case the base station does not transmit the SI message in the one of the plural first time windows in which the transmission was expected, the base station may (actively) determine that the reception thereof must have been unsuccessful. Alternatively or in addition, the determination may also be made by the base station when it is reported heavy interference by at least one UE during the one of the plural first time windows.

Again, this is however not important for the SI message acquisition. Rather, the base station may also rely on determination results from the UE(s), namely where the SI request conveys that the SI message reception was unsuccessful.

The receiver 170 of the base station receives a SI request for the at least one SI message after a determination of an unsuccessful receipt of the at least one SI message to be broadcasted in one of plural first time windows that are reoccurring at the configured indicated periodicity. The SI request includes an indication of the at least one SI message to be broadcasted. For example, this reception operation may be performed by the system information request receiver 370-c.

The transmitter 170 of the base station transmits the at least one SI message within at least one second time window which occurs after the one of the plural first time windows and before the next of the first time window that is reoccurring at the configured indicated periodicity. For example, this transmission operation may be performed by the second system information message transmitter 370-d.

Optionally, the processing circuitry 180 of the base station is enabled by the transmission of the at least one SI message within at least one second time window to (actively) determine that receiving the at least one SI message is successful. For example, this determination operation may be performed by the second system information message transmitter 370-d.

For example, in case the base station does transmit the SI message in the second time window (e.g., without experiencing any failed clear channel assessment), the base station may (actively) determine that the reception thereof must have been successful. Alternatively or in addition, the determination may also be made by the base station when it is reported no heavy interference by at least one UE during the second time windows.

Again, this is however not important for the SI message acquisition. Rather, the base station may also rely on determination results from the UE.

Implementations

In the following, exemplary implementations are described further defining the at least one second time window. These implementations are building on a common definition of the term "time interval," namely which shall be understood to correspond to the shortest periodicity at which SI messages are configured to be broadcast in the cell.

For illustrative purposes, when considering that there are broadcast three SI messages in the cell, these three SI messages having a periodicity of 8 radio frames, 16 radio frames and 32 radio frames, then the "time interval" will amount to 8 radio frames. These 8 radio frames correspond to the shortest periodicity at which SI messages are configured to be broadcast in the cell.

First Exemplary Implementation

Now, with this definition of the time interval, in a first exemplary implementation, the second time window is not only occurring between the one of the plural first time windows and before the next of the first time windows, which are reoccurring at the indicated periodicity, but it is also occurring within the same, current time interval where the unsuccessful receipt of the at least one SI message is determined.

In other words, assuming for example that the unsuccessful receipt is determined for the SI message with periodicity of 16 radio frames. Then, in this first exemplary implementation, the second time window is not only prescribed to occur between the one and the next of the first time windows reoccurring at same 16 radio frames, but it is also prescribed to occur within the same, current time interval corresponding to the first 8 radio frames within which the unsuccessful receipt of the at least SI message is determined.

In this first exemplary implementation, it is also possible to further define the at least one second time window.

In particular, in this same current time interval, the at least one first time window has a start or starting point which can be inferred by the UEs as discussed before. Then, the at least one second time window has a start or starting point within this same, current time interval, which is different from the starting point of the at least one first time window. Even more precisely, the exemplarily starting point of the second time window does not overlap but subsequently follows the entire first time window.

Second Exemplary Implementation

Alternatively, with this definition of the time interval, in a second exemplary implementation, the second time window is not only occurring between the one of the plural first time windows and before the next of the first time windows, which are reoccurring at the indicated periodicity, but it is also occurring within the next time interval, following current time interval where the unsuccessful receipt of the at least one SI message is determined.

In other words, assuming for example that the unsuccessful receipt is determined for the SI message with periodicity of 16 radio frames. Then, in this second exemplary implementation, the second time window is not only prescribed to occur between the one and the next of the first time windows reoccurring at same 16 radio frames, but it is also prescribed to occur within the next time interval, following the current time interval, corresponding to the second 8 radio frames following the time interval in which the unsuccessful receipt of the at least SI message is determined.

Also in this second exemplary implementation, it is possible to further define the at least one second time window.

In particular, in this same current time interval, the at least one first time window has a start or starting point which can be inferred by the UEs as discussed before. Then, the at least one second time window has a start or starting point within this next time interval, following current time interval, which is same as the starting point of the at least one first time window.

In other words, the exemplarily starting point of the second time window has a same (relative) time offset (e.g., in slots) from the beginning of the next time interval as the starting point of the at least one first time window from the beginning of the current time interval within which the unsuccessful receipt of the at least SI message is determined.

Assuming, for example, that the start or starting point of first time window corresponding to the SI message with periodicity of 16 radio frame is inferred to be at slot 6 within the current time interval corresponding to the first 8 radio frames, then the same start or starting point of the second time window within the next time interval corresponding to the second 8 radio frames is also at slot 6 (relative to the second 8 radio frames).

Third Exemplary Implementation

In a third exemplary implementation, which can be combined with the first or second exemplary time interval, a (further) indication is conveyed to the UE(s). Based on the (further) indication received from the base station broadcasting the at least one SI message, the UE determines the starting point of the at least one second time interval.

In a more detailed version of the third exemplary implementation, the indication, based on where the starting point is determined, is at least one of: (1) a configuration indicating the maximum number of different SI messages broadcasted by the base station in a time interval, and (2) a configuration indicating whether or not the base station is permitted to defer the starting point when broadcasting the at least one SI message.

Assuming, for example, that an indication is conveyed to the UE(s) which is in accordance with definition (1) of the third exemplary implementation. Then, the UE(s) is(are) provided with information regarding the maximum number of different SI messages to be broadcasted by the system or base station in a time interval such as the current time interval. This indication is particularly beneficial in combination with the first exemplary implementation.

In particular, from the information regarding the maximum number of different SI messages to be broadcast, the UE can infer the start or starting point of the second time window, which does not overlap but subsequently follows, within the current time interval, all the first time windows which are respectively corresponding the different SI messages.

In other words, in a case where three SI messages are to be broadcasted, and each SI message has a respective at least one first time window within the current time interval, then from the indication of the maximum number of three different SI messages, the UE(s) can infer the start or starting point for the second time window such that it subsequently follows (with or without a gap in-between) the last one of the three different first time windows within the current time interval. Therewith an overlap between all the three first time windows and the second time window within the same current time interval is avoided, irrespective of whether a SI message is broadcasted in each of the three first time windows or not.

Further, assuming, for example, that an indication is conveyed to the UE(s) which is in accordance with definition (2) of the third exemplary implementation. Then, the UE(s) is(are) provided with information whether or not the base station is permitted to defer the starting point when broadcasting the at least one SI message. This indication is also particularly beneficial in combination with the first exemplary implementation.

In particular, from the information indicating whether or not the base station is permitted to defer the starting point, the UE can derive that, for inferring the start or starting point of the of the second time window, it needs to detect (additional) information on the operational or signaling condition of the base station.

In particular, a deferred starting point of the second time window helps the base station to defer broadcasting SI messages in case it detects a non-operational or a no-signaling condition. This may correspond, for example, to a condition with very heavy interference or a condition where signaling is not permitted due to legal constraints (e.g., the BS has failed with a clear channel assessment in a NR-unlicensed deployment scenario). Only after these conditions have cleared, the base station will resume operation and will start again with carrying out transmission operations.

As part of resuming operation, the UE may detect (additional) information on the (resumed) operational or signaling condition of the base station. Having acquired this (additional) information, the UE can infer that a second time window which, in a non-deferred case, would have started during the non-operational or non-signaling condition of base station, will in a deferred case, start after the (additional) information is detected.

Fourth Exemplary Implementation

In a fourth exemplary implementation, the at least one second time includes plural second time windows. In each of the plural second time windows, the base station broadcasts a (repeated) version of the at least one SI message for which UE has transmitted the SI request. This is particularly beneficial in combination with one or more of the first to third exemplary implementation.

In more detail, in this implementation, the SI request triggers repetitions of the same at least one SI message in the plural second time windows. With such a redundant transmission of the at least one SI message, the robustness of the SI message acquisition is further facilitated.

For example, one repetition of the at least one SI message occurs in the one of the plural second time windows in the same, current time interval, or in the next time interval, respectively, and another repetition of the at least one SI message occurs in the next one of the plural second time windows in the next time interval or the time interval after the next time interval, respectively.

Assuming, for example, a combination of the fourth and the first exemplary implementation, then the one of the at least one second time window(s) is prescribed to occur within the same, current time interval where the unsuccessful receipt of the at least one SI message is determined. Thus, a repetition (or another repetition) of the at least one SI message may occur in a next one of the plural second time windows within the next time interval.

Further, assuming, for example, a combination of the fourth and the second exemplary implementation, then the one of the at least one second time window(s) is prescribed to occur within the next time interval, following the current time interval where the unsuccessful receipt of the at least one SI message is determined. Thus, a repetition (or another repetition) of the at least one SI message may occur in a next one of the plural second time windows within the time interval after the next time interval.

The above examples are only describing scenarios where the repetitions of the same at least one SI message are being transmitted in successive time intervals. This however does not always need to be the case. Rather, the number of repetitions $N_r$ may also be broadcasted in the prescribed time intervals relative to the time interval in which the unsuccessful reception of the at least one SI message was determined. Such prescribed time intervals may be indicated in form of system information configuration.

For example and (again) considering a combination of the fourth and the first exemplary implementation, when assuming that the time interval in which the unsuccessful reception was determined has a number N, then the time intervals in which the repeated transmissions may occur, can have the numbers N, N+1, N+2, . . . N+$N_r$−1.

For example and (again) considering a combination of the fourth and the second exemplary implementation, when assuming that the time interval in which the unsuccessful reception was determined has a number N, then the time intervals in which the repeated transmissions may occur, can have the numbers N+1, N+2, N+3, and N+$N_r$.

Notably, the repetitions of an SI messages are only required as long as the next SI message is not broadcast in the reoccurring time window at the indicated periodicity. As soon as the next SI message is to be broadcast in a next first time window reoccurring at the periodicity, the repeated transmissions can be aborted (stopped).

For an SI message which is to be broadcast a periodicity of 16 radio frames, it may be superfluous to have more than one SI message repetition.

In this context, the system information configuration may further indicate the number of repetitions in form of a radio resource control. RRC, message.

FIRST EXEMPLARY EMBODIMENT

Figure 5:
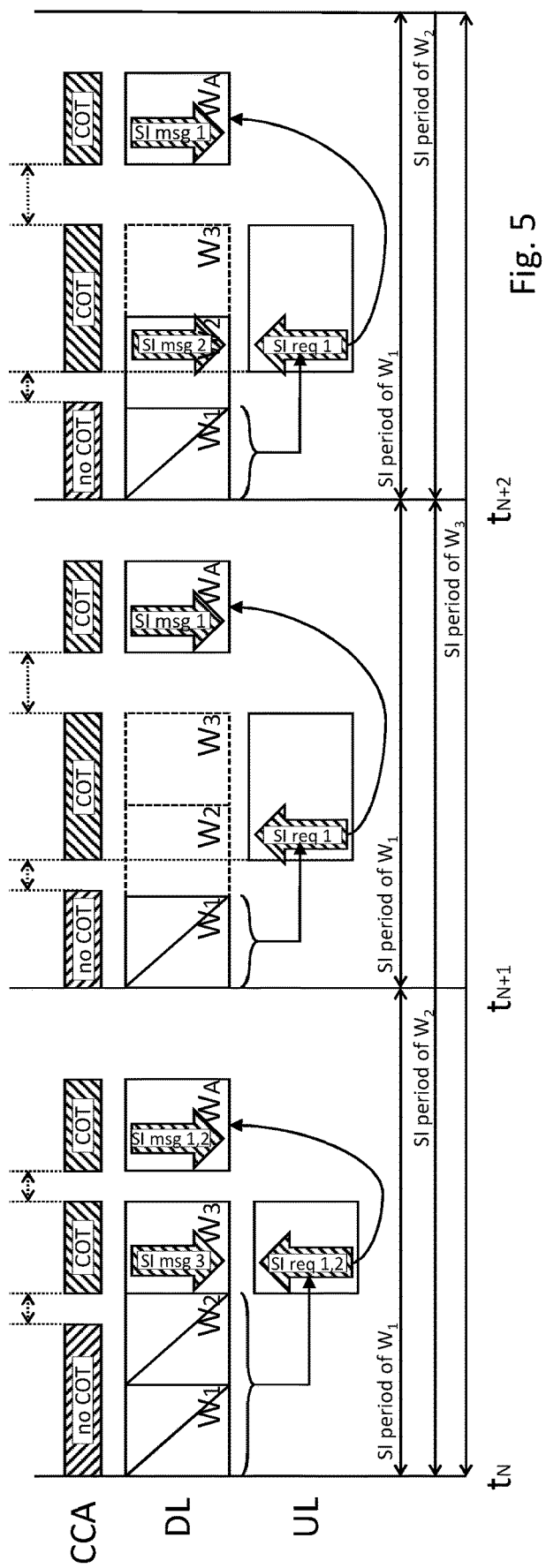
FIG. 5 shows a schematic illustration of a system information (SI) message acquisition mechanism according to a first exemplary embodiment.

Referring now to an exemplary first embodiment which will be described with reference to FIG. 5 depicting a schematic illustration of a system information (SI) message acquisition mechanism according to this first exemplary embodiment.

The first exemplary embodiment is conceived with an understanding that the SI message acquisition is being performed in a 3GPP NR implementation operating in unlicensed spectrum (NR-U). From the architectural perspective, this operation in unlicensed spectrum may be the result of an operation in form of NR-based Licensed Assisted Access (LAA), and an NR-based standalone cell operation in unlicensed spectrum.

The operation in unlicensed spectrum may be subject to national regulations.

For example, some countries may prescribe that devices have to perform a Clear Channel Assessment (CCA) before occupying the radio channel with a data transmission. It is only allowed to initiate a transmission on the unlicensed channel after detecting a free channel, e.g., on energy detection. During the CCA, the device has to observe the channel for a certain minimum time.

The authors of the present disclosure have recognized that performing system information (SI) message acquisition in an implementation operating in unlicensed spectrum can be challenging. Neither the UE nor the BS know in advance whether or not there is a free channel to carry SI messages. In particular, with the prescribed time windows, the base station may be faced with a situation where it cannot occupy the channel during the entire time window during which the respective SI message is to be broadcast.

Thus, a mechanism is required which is reliable and robust to permit SI message acquisition even in cases where a failed clear channel assessment may block transmissions for a considerable amount of time. In other words, the reliability and robustness of the SI message acquisition are of particular importance in case of a NR-U scenario.

In more detail, FIG. 5 shows for three subsequent time intervals, namely $t_N$, $t_{N+1}$, $t_{N+2}$, and the corresponding results of the clear channel assessment (CCA), namely whether the BS has successfully occupied the channel (indicated as channel occupation time, COT), or has failed therewith (indicated as no channel occupation time, no COT).

In between subsequent periods of no COT and COT, or COT and COT, there are indicated gaps which amount to at least the minimum time required during the CCA for detecting a free channel or not. Further, since there exists a maximum time for the channel occupation time, COT, also subsequent periods of COT are separated by gaps.

Further, FIG. 5 shows the downlink (indicated as DL) activity and uplink (indicated as UL) activity in a cell served by the base station, BS. Since the illustration is focused on SI message acquisition, the presented level of information has been reduced in said respect. In other words, FIG. 5 shows time intervals, time windows, SI messages and SI request and their sequence in time.

For example, the downlink activity in form of an third SI message is depicted as arrow pointing downward with indication "SI msg. 3" whereas a SI request for a first and a second SI message is depicted as an arrow pointing upward with an indication "SI req. 1,2."

In more detail, the embodiment illustrated in FIG. 5 assumes a scenario where there are three SI messages broadcast in a cell served by the BS.

For the first SI message, a short periodicity is indicated in the system information configuration corresponding to the shown "SI period of $W_1$." For the second SI message, a medium periodicity is indicated in the system information configuration corresponding to the shown "SI period of $W_2$." And for the third SI message, a large periodicity is indicated in the system information configuration corresponding to the shown "SI period of $W_3$."

For each of the first to third SI messages, the respective time window W1, W2 and W3 corresponds to what is described as "first time window" in the generic scenario.

Based on the periodicities of the three SI messages which are being indicated in the system information configuration, the one or more UE(s) is capable of inferring first time windows for each of the three SI messages. In the embodiment, the first time windows are assumed to have a same window length.

In particular the one or more UE(s) is capable of inferring a location of the first time window $W_1$ for the first SI message (or SI msg. 1), a location of the second time window $W_2$ for the second SI message (or SI msg. 2) and a location of the third time window $W_3$ for the third SI message (or SI msg. 3).

The starting point (and also location) of each of the three time windows W1, W2 and W3 is same in all three time interval $t_N$, $t_{N+1}$, $t_{N+2}$.

Differences between the time intervals result from the differences in periodicity for each of the SI messages. Since the second and third SI message have a longer periodicity, no broadcasting of SI message 2 is to be expected within the time window $W_2$ in time interval $t_{N+1}$ and no broadcasting of SI message 3 is to be expected within the time window W3 in the time intervals $t_{N+1}$ and $t_{N+2}$. Time windows where no SI message is to be expected are indicated with broken lines.

At the beginning of the first time interval $t_N$, the clear channel assessment, performed by the BS, results in a failure (no COT). In particular, the failure to occupy the channel leads to a situation where the BS cannot broadcast the first SI message (SI msg. 1) in the time window $W_1$ and cannot broadcast the second SI message (SI msg. 2) in the time window $W_2$.

Only thereafter, the BS succeeds with occupying the channel (COT) such that the BS broadcasts the third SI message (SI msg. 3) in the time window $W_3$.

Approximately at the same time, the one or more UE(s) determines that it has been unsuccessful with receiving the first SI message within time window $W_1$, and the second SI message within time window $W_2$.

Thus, once the one or more UE(s) detect that the BS has occupied the channel, it transmits a SI request for the first SI message, and a SI request for the second SI message (SI req. 1,2). These SI requests are transmitted in the uplink.

Having received the SI requests for the first and second SI message, the BS broadcasts the requested SI messages (SI msg 1,2) in an additional time window $W_A$ within the same time interval $t_N$. With the additional time window $W_A$, the BS has an additional opportunity for broadcasting SI messages to the one or more UE for which an earlier reception has been unsuccessful.

The additional time window $W_A$ corresponds to what is described as "second time window" in the generic scenario.

In more detail, after elapse of the time window $W_3$, the BS succeeds again which occupying the channel (COT); thus, the BS may resume communication. However neither the BS nor the UE(s) known in advance when this will happen.

In this respect the BS has indicated a configuration to the one or more UE(s) that it is permitted to defer the starting point of the additional time window $W_A$.

Accordingly, the one or more UE(s) determines the starting point of the additional time window in that it first attempts to detect whether or not the BS has resumed communication after the elapse of the time window $W_3$. Only when it has successfully detected the BS's resumed communication, then, the one or more UE(s) determines the starting point for the additional time window $W_A$ corresponding to this time instant.

In this embodiment, it is also assumed that the additional time window $W_A$ has a same window length as time windows $W_1$, $W_2$ and $W_3$.

For the further time intervals $t_{N+1}$, $t_{N+2}$, the SI acquisition generally stays the same with the difference that the additional time window may be located at different positions within time due to the non-deterministic availability of the channel.

SECOND EXEMPLARY EMBODIMENT

Figure 6:
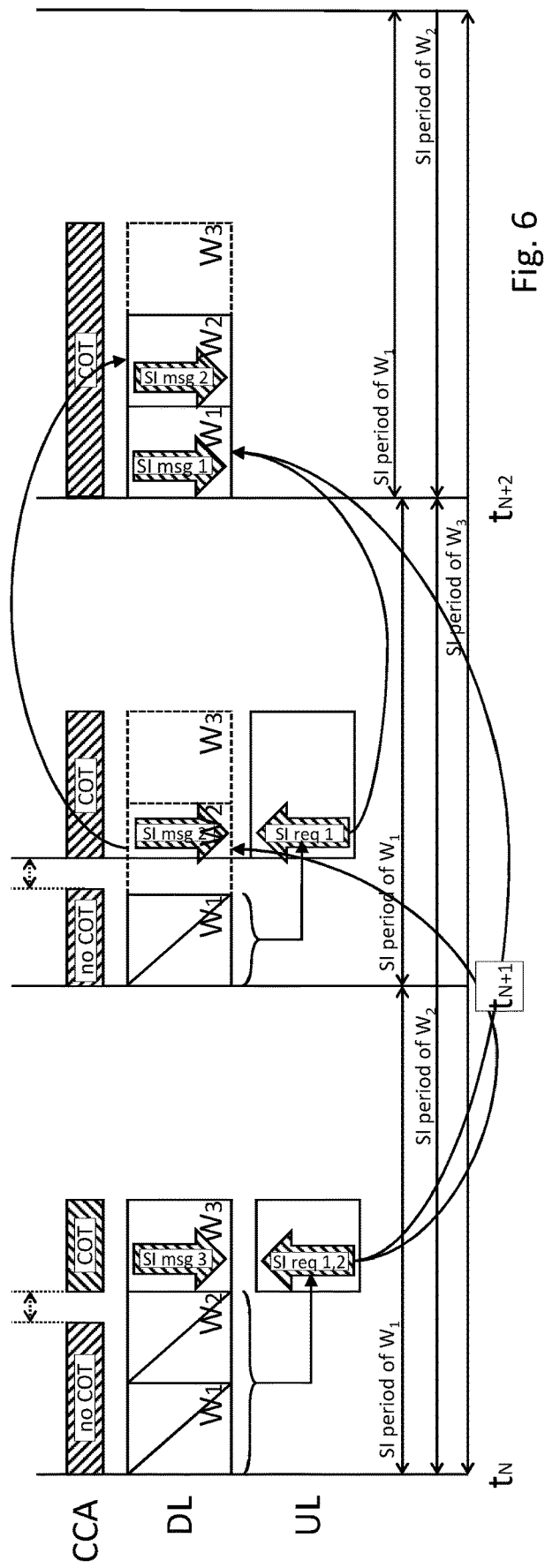
FIG. 6 depicts a schematic illustration of a system information (SI) message acquisition mechanism according to a second exemplary embodiment.

Referring now to an exemplary second embodiment which will be described with reference to FIG. 6 depicting a schematic illustration of a system information (SI) message acquisition mechanism according to this second exemplary embodiment.

The second exemplary embodiment is (again) conceived with an understanding that the SI message acquisition is being performed in a 3GPP NR implementation operating in unlicensed spectrum (NR-U).

Again, FIG. 6 shows for three subsequent time intervals, namely $t_N$, $t_{N+1}$, $t_{N+2}$, and the corresponding results of the clear channel assessment (CCA), namely whether the BS has successfully occupied the channel (indicated as channel occupation time, COT), or has failed therewith (indicated as no channel occupation time, no COT).

In between subsequent periods of no COT and COT, there are indicated gaps which amount to at least the minimum time required during the CCA for detecting a free channel or not.

FIG. 6 further shows the downlink (indicated as DL) activity and uplink (indicated as UL) activity in a cell served by the base station, BS. Since the illustration is focused on SI message acquisition, the presented level of information has been reduced in said respect. In other words, FIG. 6 shows time intervals, time windows, SI messages and SI request and their sequence in time.

For example, the downlink activity in form of an third SI message is depicted as arrow pointing downward with indication "SI msg. 3" whereas a SI request for a for a first and a second SI message is depicted as an arrow pointing upward with an indication "SI req. 1,2."

In more detail, the embodiment illustrated in FIG. 6 assumes a scenario where there are three SI messages broadcast in a cell served by the BS.

For the first SI message, a short periodicity is indicated in the system information configuration corresponding to the shown "SI period of $W_1$." For the second SI message, a medium periodicity is indicated in the system information configuration corresponding to the shown "SI period of $W_2$." And for the third SI message, a large periodicity is indicated in the system information configuration corresponding to the shown "SI period of $W_3$."

For each of the first to third SI messages, the respective time window W1, W2 and W3 corresponds to what is described as "first time window" in the generic scenario.

Based on the periodicities of the three SI messages which are being indicated in the system information configuration, the one or more UE(s) is capable of inferring first time windows for each of the three SI messages. In the embodiment, the first time windows are assumed to have a same window length.

In particular the one or more UE(s) is capable of inferring a location of the first time window $W_1$ for the first SI message (or SI msg. 1), a location of the second time window $W_2$ for the second SI message (or SI msg. 2) and a location of the third time window $W_3$ for the third SI message (or SI msg. 3).

The starting point (and also location) of each of the three time windows W1, W2 and W3 is same in all three time interval $t_N$, $t_{N+1}$, $t_{N+2}$.

Differences between the time intervals result from the differences in periodicity for each of the SI messages. Since the second and third SI message have a longer periodicity, no broadcasting of SI message 2 is to be expected within the time window $W_2$ in time interval $t_{N+1}$ and no broadcasting of SI message 3 is to be expected within the time window W3 in the time intervals $t_{N+1}$ and $t_{N+2}$. Time windows where no SI message is to be expected are indicated with broken lines.

At the beginning of the first time interval $t_N$, the clear channel assessment, performed by the BS, results in a failure (no COT). In particular, the failure to occupy the channel leads to a situation where the BS cannot broadcast the first SI message (SI msg. 1) in the time window W$_1$ and cannot broadcast the second SI message (SI msg. 2) in the time window W$_2$.

Only thereafter, the BS succeeds with occupying the channel (COT) such that the BS broadcasts the third SI message (SI msg. 3) in the time window W$_3$.

Approximately at the same time, the one or more UE(s) determines that it has been unsuccessful with receiving the first SI message within time window W$_1$, and the second SI message within time window W$_2$.

Thus, once the one or more UE(s) detects that the BS has occupied the channel, it transmits a SI request for the first SI message, and a SI request for the second SI message (SI req. 1,2). These SI requests are transmitted in the uplink.

Having received the SI requests for the first and second SI message, the BS attempts to broadcast the requested SI messages (SI msg 1,2) in additional time windows within the next time interval t$_{N+1}$ following the current time interval t$_N$.

In particular, for broadcasting the first and second SI message, the BS reverts to different additional time windows in which no SI message are to be expected. Only in response to the SI requests, the BS uses said additional time windows for broadcasting the first and second SI messages.

The additional time windows corresponds to what is described as "second time window" in the generic scenario.

For the first SI message, the one or more UE(s) infers a starting point of the additional time window within the next time interval t$_{N+1}$ which is the same as the starting point of the time window W$_1$ for the first SI message within the time interval t$_N$ in which the reception of the second SI message was unsuccessful.

In other words, the starting point of the additional time window for the first SI message has a same relative offset within the next time interval t$_{N+1}$ as the relative offset to the starting point of the time window W$_1$ within the time interval t$_N$.

Thus, the additional time window for the first SI message within the next time interval t$_{N+1}$ corresponds to what is indicated as time window W$_1$ within same next time interval t$_{N+1}$. This time window W$_1$ within same next time interval t$_{N+1}$ would, however, also normally have been used for broadcasting of a first SI message.

Accordingly, this additional time window for the first SI message within the next time interval t$_{N+1}$ is not a time window in which no SI message is expected, but is a time window in which broadcasting is expected.

Thus, the BS aborts (stops) the broadcasting in response to the respective SI request from an (earlier) time interval. And, instead, the BS resumes operation with again attempting the regular broadcasting operation, namely the broadcasting of the first SI message reoccurring with the indicated periodicity.

In other words, with the special location of the additional time window, a situation can occur where the additional time window coincides with a (regular) time window within a same time interval. As soon as the BS detects such a situation, it aborts (stops) the broadcasting of SI messages in response to the SI request.

Due to the BS aborting (stopping) the broadcasting SI messages in response to an SI request from an earlier time interval, this facilitates avoiding the broadcasting of outdated SI messages. Also with this infinite processing loops can be avoided.

Differently, for the second SI message, the one or more UE(s) infers a starting point of the additional time window within the next time interval t$_{N+1}$ as the starting point of the time window W$_2$ for the second SI message within the time interval t$_N$ in which the reception of the second SI message was unsuccessful.

In other words, the starting point of the additional time window for the second SI message has a same relative offset within the next time interval t$_{N+1}$ which is the same as the relative offset to the starting point of the time window W$_2$ within the time interval t$_N$.

Thus, the additional time window for the second SI message within the next time interval t$_{N+1}$ corresponds to what is indicated as time window W$_2$ with broken lines within same next time interval t$_{N+1}$. This time window W$_2$ within same next time interval t$_{N+1}$ would normally not have been used for broadcasting of a second SI message.

At the beginning of the next time interval t$_{N+1}$, the clear channel assessment, performed by the BS, results (again) in a failure (no COT). In particular, the failure to occupy the channel leads to a situation where the BS cannot broadcast the first SI message (SI msg. 1) in the time window W$_1$. Only thereafter, the BS succeeds with occupying the channel (COT).

Approximately at the same time, the one or more UE(s) determines that it has been unsuccessful with receiving the first SI message within time window W$_1$.

Thus, once the one or more UE(s) detects that the BS has (again) occupied the channel, it transmits a SI request for the first SI message (SI req. 1). The SI requests are transmitted in the uplink.

During the time window W$_2$ the clear channel assessment, performed by the BS, is (again) successful and the BS proceeds to (again) occupy the channel (COT); thus, the BS may resume communication. However neither the BS nor the UE(s) known in advance when this will happen.

The remainder of the time window W$_2$ is sufficient for the BS to broadcast the second SI message (SI msg. 2) in the time window W$_2$.

In this embodiment, it is also assumed that the additional time window W$_A$ has a same window length as time windows W1, W2 and W3.

At the beginning of the even further time interval t$_{N+2}$, the clear channel assessment, performed by the BS, is (immediately) successful. Thus, the BS (immediately) succeeds with occupying the channel (COT).

Having received the SI requests for the first SI message, the BS attempts to broadcast the requested SI messages (SI msg 1) in an additional time window within this even further time interval t$_{N+2}$ following the time interval t$_{N+1}$.

For the first SI message, the one more UE(s) infers a starting point of the additional time window within this even further time interval t$_{N+2}$ which is the same as the starting point of the time window W$_1$ for the first SI message within the time interval t$_{N+1}$ in which the reception of the first SI message was unsuccessful.

However, also here a situation occurs where the additional time window coincides with a (regular) time window within a same time interval. As soon as the BS detects this situation, it aborts (stops) the broadcasting of SI messages in response to the SI request.

Instead, the BS resumes operation with again attempting and (also) successfully completing the regular broadcasting operation, namely the broadcasting of the first SI message within the time window W$_1$ reoccurring at the indicated periodicity.

Additionally, in this second exemplary embodiment, a further detail is shown.

In this embodiment, each SI request is configured to trigger the broadcasting of multiple repetitions of the same at least one SI message in plural additional time windows. With such a redundant transmission of the at least one SI message, the robustness of the SI message acquisition is further facilitated.

With regard to the first SI message, the broadcasting of multiple repetitions of the same first SI message in plural additional time windows is not carried out. This results from the fact that the attempt to broadcast already one of said first SI messages within an additional time window is aborted (stopped) by the BS.

Thus, the broadcasting of multiple repetitions is only shown for the second SI message.

With regard to the second SI message, the SI request is transmitted in the time interval $t_N$.

Accordingly, one of the additional second time window(s) for the repeated broadcasting of the second SI message occurs within the next time interval $t_{N+1}$, following the current time interval $t_N$ where the unsuccessful receipt of second SI message is determined.

Another one of the additional time windows for the repeated broadcasting of the second SI message occurs within the even further time interval $t_{N+2}$ (indicated through the arrow between the SI message in time interval $t_{N+1}$ and the time window W2 in time interval $t_{N+2}$).

However, since also here a situation occurs where the other one of the additional time windows coincides with a (regular) time window within a same time interval $t_{N+2}$, the BS detects this situation and aborts (stops) the repeated broadcasting.

Instead, the BS resumes operation with again attempting and (also) successfully completing the regular broadcasting operation, namely the broadcasting of the second SI message within the time window $W_2$ reoccurring at the indicated periodicity.

According to a first aspect, a user equipment, UE, comprising a receiver, a transmitter and processing circuitry. The receiver, in operation, receives a system information configuration for at least one system information, SI, message, the configuration indicating a periodicity at which the at least one SI message is being broadcasted. The processing circuitry, in operation and using the receiver, determines that receiving the at least one SI message, to be broadcasted in one of plural first time windows that are reoccurring at the indicated periodicity, is unsuccessful. The transmitter, in operation, transmits a SI request for the at least one SI message after determining the unsuccessful receipt of the at least one SI message, wherein the SI request includes an indication of the at least one SI message to be broadcasted. Further, the receiver, in operation, receives the at least one SI message within at least one second time window which occurs after the one of the plural first time windows and before the next of the first time window that is reoccurring at the indicated periodicity, and the processor, in operation, determines that receiving the at least one SI message is successful.

According to a second aspect provided in addition to the first aspect, the unsuccessful receipt of the at least one SI message is determined within a current time interval, wherein the time interval corresponds to the shortest periodicity at which SI messages are configured to be broadcast, and, the at least one second time window for receiving one of the at least one SI message occurs within the same, current time interval, According to a third aspect provided in addition to the first aspect, the unsuccessful receipt of the at least one SI message is determined within a current time interval, wherein the time interval corresponds to the shortest periodicity at which SI messages are configured to be broadcast, and, the at least one second time windows for receiving one of the at least one SI message occurs within a next time interval following the current time interval.

According to a fourth aspect provided in addition to the first or second aspect, the at least one second time window has a starting point within the same, current time interval which is different from the starting point of the one of the plural first time windows within the current time interval, the current time interval being where the unsuccessful receipt of the at least one SI message is determined.

According to a fifth aspect provided in addition to the first or third aspect, the at least one second time window has a starting point within the next time interval which is same as the starting point of the one of the plural first time windows within the current time interval, the current time interval being where the unsuccessful receipt of the at least one SI message is determined.

According to a sixth aspect provided in addition to the fourth or fifth aspect, in case of the different starting point of the at least one second time window, the processing circuitry, in operation and using the receiver, determines the starting point based on an indication received from a base station broadcasting the at least one SI message.

According to a seventh aspect provided in addition to the sixth aspect, the indication, based on which the starting point is determined, is at least one of: a configuration indicating the maximum number of different SI messages broadcasted by the base station in a time interval, and a configuration indicating whether or not the base station is permitted to defer the starting point when broadcasting the at least one SI message.

According to an eight aspect provided in addition to the first to seventh aspect, the at least one first or second time window has an individually configurable window length, and each window length is indicated individually in the system information configuration.

According to a ninth aspect provided in addition to the second to eighth aspect, the at least one second time window includes plural second time windows, and the SI request triggers repetitions of the same at least one SI message in the plural second time windows.

According to a tenth aspect provided in addition to the ninth aspect, one repetition of the at least one SI message occurs in the one of the plural second time windows in the same, current time interval, or in the next time interval, respectively, and another repetition of the at least one SI message occurs in the next one of the plural second time windows in the next time interval or the time interval after the next time interval, respectively.

According to an eleventh aspect provided in addition to the ninth and the tenth aspect, the system information configuration further indicates the number of repetitions in form of a radio resource control. RRC, message.

According to a twelfth aspect provided in addition to the first to eleventh aspect, the receiver, in operation, receives, at the starting point of the at least one second time window, at least one downlink control information, DCI, scheduling the at least one SI message, and the at least one DCI is scheduling exactly one or plural, different SI messages, including the at least one SI message, within the at least one second time window.

According to a thirteenth aspect provided in addition to the twelfth aspect, in case of plural, different SI messages within the at least one second time window, exactly one of the at least one DCI schedules the different SI messages, the exactly one DCI includes an indication of each of the different SI messages which are scheduled within the at least one second time window, or plural ones of the at least one DCI respectively schedule the different SI messages, and each one of the plural DCIs is scrambled with a different one of plural system information, SI, radio network temporary identifiers, RNTIs indicating the different SI messages.

According to a fourteenth aspect provided in addition to the first to thirteenth aspect, plural, different SI messages are received in form of a radio resource control, RRC, message having a transport block size, TBS exceeding 2,976 bits.

According to a fifteenth aspect provided in addition to the first to fourteenth aspect, the system information configuration further indicates which SI message(s) is/are allowed to be broadcasted in the at least one second time window.

According to a sixteenth aspect, method for a UE is provided, comprising the steps of: receiving a system information configuration for at least one system information, SI, message, the configuration indicating a periodicity at which the at least one SI message is being broadcasted, determining that receiving the at least one SI message, to be broadcasted in one of plural first time windows that are reoccurring at the indicated periodicity, is unsuccessful, and transmitting a SI request for the at least one SI message after determining the unsuccessful receipt of the at least one SI message, wherein the SI request includes an indication of the at least one SI message to be broadcasted, wherein: receiving the at least one SI message within at least one second time window occurs after the one of the plural first time windows and before the next of the first time window that is reoccurring at the indicated periodicity, and determining that receiving the at least one SI message is successful.

According to ta seventeenth aspect, a base station, BS is provided, comprising a transmitted, a receiver. The transmitter, in operation, transmits a system information configuration for at least one system information, SI, message, the configuration indicating a periodicity at which the at least one SI message is being broadcasted. The receiver, in operation, receives a SI request for the at least one SI message after a determination of an unsuccessful receipt of the at least one SI message to be broadcasted in one of plural first time windows that are reoccurring at the indicated periodicity, wherein the SI request includes an indication of the at least one SI message to be broadcasted. The transmitter, in operation, transmits the at least one SI message within at least one second time window which occurs after the one of the plural first time windows and before the next of the first time window that is reoccurring at the indicated periodicity, enabling the determination that receiving the at least one SI message is successful.

According to an eighteenth aspect, a method for a BS is provided, comprising the steps of: transmitting a system information configuration for at least one system information, SI, message, the configuration indicating a periodicity at which the at least one SI message is being broadcasted, and receiving a SI request for the at least one SI message after a determination of an unsuccessful receipt of the at least one SI message to be broadcasted in one of plural first time windows that are reoccurring at the indicated periodicity, wherein the SI request includes an indication of the at least one SI message to be broadcasted, wherein: transmitting the at least one SI message within at least one second time window which occurs after the one of the plural first time windows and before the next of the first time window that is reoccurring at the indicated periodicity, enabling the determination that receiving the at least one SI message is successful.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs.

The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor.

In addition, a FPGA (Field Programmable Gate Array) that can be programmed after the manufacture of the LSI or a reconfigurable processor in which the connections and the settings of circuit cells disposed inside the LSI can be reconfigured may be used.

The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The various embodiments described above can be combined to provide further embodiments. All of the U.S.

patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE), comprising:
a receiver, which in operation, receives a system information configuration for at least one system information (SI) message, the configuration indicating a periodicity at which the at least one SI message is being broadcasted,
a processing circuitry, which in operation and using the receiver, determines that receiving the at least one SI message, to be broadcasted in a first time window out of plural first time windows that are reoccurring at the indicated periodicity, is unsuccessful, and
a transmitter, which in operation, transmits a SI request for the at least one SI message after determining the unsuccessful receipt of the at least one SI message, wherein the SI request includes an indication of the at least one SI message to be broadcasted,
wherein:
the receiver, in operation, receives the at least one SI message within at least one second time window which occurs after the first time window out of the plural first time windows and before a next first time window following the first time window that is reoccurring at the indicated periodicity, and the processing circuitry, in operation, determines that receiving the at least one SI message is successful, and
the processing circuitry, responsive to detection of successful channel occupation indicative of resumed communication, determines a starting point of the at least one second time window.

2. The UE according to claim 1, wherein
the unsuccessful receipt of the at least one SI message is determined within a current time interval,
wherein the time interval corresponds to the shortest periodicity at which SI messages are configured to be broadcast,
and, either
the at least one second time window for receiving one of the at least one SI message occurs within the current time interval,
or
the at least one second time windows for receiving one of the at least one SI message occurs within a next time interval following the current time interval.

3. The UE according to claim 2, wherein
the at least one second time window has the starting point within the current time interval which is different from a starting point of the first time window out of the plural first time windows within the current time interval, or
the at least one second time window has the starting point within the next time interval which is same as
a starting point of the first time window out of the plural first time windows within the current time interval,
the current time interval being where the unsuccessful receipt of the at least one SI message is determined.

4. The UE according to claim 3, wherein,
in case the starting point of the at least one second time window is different from the starting point of the first time window,
the processing circuitry, in operation and using the receiver, determines the starting point of the at least one second time window based on an indication received from a base station broadcasting the at least one SI message.

5. The UE according to claim 4, wherein
the indication, based on which the starting point is determined, is at least one of:
a configuration indicating the maximum number of different SI messages broadcasted by the base station in a time interval, and
a configuration indicating whether or not the base station is permitted to defer the starting point when broadcasting the at least one SI message.

6. The UE according to claim 1, wherein,
the at least one first or second time window has an individually configurable window length, and
each window length is indicated individually in the system information configuration.

7. The UE according to claim 2, wherein,
the at least one second time window includes plural second time windows, and
the SI request triggers repetitions of the same at least one SI message in the plural second time windows.

8. The UE according to claim 7, wherein,
one repetition of the at least one SI message occurs in the at least one of the plural second time windows in the current time interval, or in the next time interval, respectively, and
another repetition of the at least one SI message occurs in the next one of the plural second time windows in the next time interval or the time interval after the next time interval, respectively.

9. The UE according to claim 7, wherein,
the system information configuration further indicates the number of repetitions in form of a radio resource control (RRC) message.

10. The UE according to claim 1, wherein,
the receiver, in operation, receives, at the starting point of the at least one second time window, at least one downlink control information (DCI) scheduling the at least one SI message, and
the at least one DCI is scheduling exactly one or plural, different SI messages, including the at least one SI message, within the at least one second time window.

11. The UE according to claim 10, wherein,
in case of plural, different SI messages within the at least one second time window,
exactly one of the at least one DCI schedules the different SI messages, the exactly one DCI includes an indication of each of the different SI messages which are scheduled within the at least one second time window,
or
plural ones of the at least one DCI respectively schedule the different SI messages, and each one of the plural DCIs is scrambled with a different one of plural system information radio network temporary identifiers (RN-TIs) indicating the different SI messages.

12. The UE according to claim 1, wherein,
plural, different SI messages are received in form of a radio resource control (RRC) message having a transport block size (TBS) exceeding 2,976 bits, and
the system information configuration further indicates which SI message(s) is/are allowed to be broadcasted in the at least one second time window.

13. A method for a user equipment (UE), comprising the steps of:
receiving a system information configuration for at least one system information (SI) message, the configuration indicating a periodicity at which the at least one SI message is being broadcasted,
determining that receiving the at least one SI message, to be broadcasted in a first time window out of plural first time windows that are reoccurring at the indicated periodicity, is unsuccessful, and
transmitting a SI request for the at least one SI message after determining the unsuccessful receipt of the at least one SI message, wherein the SI request includes an indication of the at least one SI message to be broadcasted,
wherein:
receiving the at least one SI message within at least one second time window occurs after the first time window out of the plural first time windows and before a next first time window following the first time window that is reoccurring at the indicated periodicity, and determining that receiving the at least one SI message is successful, and
responsive to detection of successful channel occupation indicative of resumed communication, determining a starting point of the at least one second time window.

14. A base station (B S), comprising:
a transmitter, which in operation, transmits a system information configuration for at least one system information (SI) message, the configuration indicating a periodicity at which the at least one SI message is being broadcasted, and
a receiver, which in operation, receives a SI request for the at least one SI message after a determination of an unsuccessful receipt of the at least one SI message to be broadcasted in a first time window out of plural first time windows that are reoccurring at the indicated periodicity, wherein the SI request includes an indication of the at least one SI message to be broadcasted,
wherein:
the transmitter, in operation, transmits the at least one SI message within at least one second time window which occurs after the first time window out of the plural first time windows and before a next first time window following the first time window that is reoccurring at the indicated periodicity, enabling a determination that receiving the at least one SI message is successful, and enabling, based on successful channel occupation indicative of resumed communication, a determination of a starting point of the at least one second time window.

15. A method for a base station (BS), comprising the steps of:
transmitting a system information configuration for at least one system information (SI) message, the configuration indicating a periodicity at which the at least one SI message is being broadcasted,
receiving a SI request for the at least one SI message after a determination of an unsuccessful receipt of the at least one SI message to be broadcasted in a first time window out of plural first time windows that are reoccurring at the indicated periodicity, wherein the SI request includes an indication of the at least one SI message to be broadcasted,
transmitting the at least one SI message within at least one second time window which occurs after the first time window out of the plural first time windows and before a next first time window following the first time window that is reoccurring at the indicated periodicity, enabling a determination that receiving the at least one SI message is successful, and enabling, based on successful channel occupation indicative of resumed communication, a determination of a starting point of the at least one second time window.

* * * * *